US009288304B2

(12) United States Patent
Lin et al.

(10) Patent No.: US 9,288,304 B2
(45) Date of Patent: Mar. 15, 2016

(54) MOBILE COMMUNICATION DEVICE AND COMMUNICATION METHOD THEREOF

(75) Inventors: Han-Chang Lin, Taipei (TW); Cho-Yi Lin, Taipei (TW)

(73) Assignee: Shenzhen China Star Optoelectronics Technology Co., Ltd., Guangming District of Shenzhen, Shenzhen, Guangdong (CN)

(\*) Notice: Subject to any disclaimer, the term of this patent is extended or adjusted under 35 U.S.C. 154(b) by 147 days.

(21) Appl. No.: 13/562,666

(22) Filed: Jul. 31, 2012

(65) Prior Publication Data
US 2013/0244727 A1 Sep. 19, 2013

(30) Foreign Application Priority Data

Mar. 16, 2012 (TW) .............................. 101109175 A

(51) Int. Cl.
*H04M 1/725* (2006.01)
*H04B 1/3888* (2015.01)
*H04M 1/02* (2006.01)
(52) U.S. Cl.
CPC ......... *H04M 1/72563* (2013.01); *H04B 1/3888* (2013.01); *H04M 1/72575* (2013.01); *H04M 1/0254* (2013.01)
(58) Field of Classification Search
CPC .......... H04M 1/72575; H04M 1/0202; H04M 2250/14; H04M 17/106; H04M 1/0247; H04M 1/0274; H04M 1/72544; H04M 2215/2026; H04M 2215/32; H04M 1/0264; H04M 1/0266; H04M 1/03; H04M 1/7253; H04M 1/72547; H04M 2207/18
USPC ............... 455/3.01, 89, 100, 555.1, 557, 403, 455/575.1, 575.6, 575.8
See application file for complete search history.

(56) References Cited

U.S. PATENT DOCUMENTS

| 5,923,735 A * | 7/1999 | Swartz ...................... G07F 7/00 235/472.01 |
| 7,079,864 B2 * | 7/2006 | Engstrom ............ H04B 1/3877 379/433.01 |

(Continued)

FOREIGN PATENT DOCUMENTS

| CN | 1428037 A | 7/2003 |
| CN | 1642182 A | 7/2005 |

(Continued)

OTHER PUBLICATIONS

First Office Action; Taiwanese Patent Application No. 101109175; Apr. 9, 2014; Taiwan Intellectual Property Office; Taipei, Taiwan.

(Continued)

*Primary Examiner* — Edward Urban
*Assistant Examiner* — Max Mathew
(74) *Attorney, Agent, or Firm* — Winston Hsu; Scott Margo

(57) ABSTRACT

When a back cover of a mobile communication device with replaceable cover is replaced, the mobile communication device may perform a corresponding application or enable a special function according to the back cover. The mobile communication device includes a back cover and a body including a processing unit, a storage unit, and a second connection interface. The back cover includes an integrated circuit (IC) element and a first connection interface. The IC element has identification information. The storage unit stores at least an application and a mapping table. The mapping table records the corresponding application of each identification information. When the back cover is assembled to the body, the first connection interface is connected to the second connection interface. The processing unit receives the identification information and looks up the mapping table according the identification information. The processing unit enables the corresponding application according to the mapping table.

15 Claims, 8 Drawing Sheets

(56) References Cited

U.S. PATENT DOCUMENTS

| | | | |
|---|---|---|---|
| 7,146,196 B2* | 12/2006 | Chen | H04W 88/02 455/575.1 |
| 7,197,347 B2* | 3/2007 | Chen | H04M 1/72575 455/575.1 |
| 7,233,787 B2* | 6/2007 | Higuchi | H04H 60/91 455/413 |
| 7,844,288 B2* | 11/2010 | Bayne | G06Q 30/02 455/412.1 |
| 7,917,168 B2* | 3/2011 | Silverbrook | B41J 2/01 358/473 |
| 8,406,737 B2* | 3/2013 | Jung | H04N 7/163 455/3.01 |
| 8,548,540 B2* | 10/2013 | Jain | G06K 19/07739 455/557 |
| 2003/0064689 A1* | 4/2003 | Engstrom | H04M 1/0202 455/90.1 |
| 2006/0219776 A1* | 10/2006 | Finn | B60R 25/25 235/380 |
| 2008/0148204 A1* | 6/2008 | Bueti et al. | 716/6 |
| 2008/0177769 A1* | 7/2008 | Albert | H04N 1/41 |
| 2010/0180063 A1 | 7/2010 | Ananny et al. | |

FOREIGN PATENT DOCUMENTS

| | | |
|---|---|---|
| EP | 1381205 A1 | 1/2004 |
| TW | 200623793 A | 12/1993 |
| TW | 200849934 A | 12/2008 |

OTHER PUBLICATIONS

Final Office Action; Taiwanese Patent Application No. 101109175; Dec. 29, 2014; Taiwan Intellectual Property Office; Taipei, Taiwan.

Search Report; Taiwanese Patent Application No. 101109175; Apr. 7, 2014; Taiwan Intellectual Property Office; Taipei, Taiwan.

First Office Action, Chinese Patent Application No. 201210084236.9; Feb. 25, 2015; State Intellectual Property Office of the People's Republic of China.

\* cited by examiner

MOBILE COMMUNICATION DEVICE AND COMMUNICATION METHOD THEREOF

CROSS-REFERENCE TO RELATED APPLICATIONS

This non-provisional application claims priority under 35 U.S.C. §119(a) on Patent Application No(s). 101109175 filed in Taiwan, R.O.C. on Mar. 16, 2012, the entire contents of which are hereby incorporated by reference.

BACKGROUND

1. Technical Field

The disclosure relates to a mobile communication device, and more particularly to a mobile communication device with replaceable back cover.

2. Related Art

With development of integrated circuit, electronic device such as mobile communication device becomes more compact and light. Nowadays, mobile communication device has become an indispensable electronic product for people's daily life. Early mobile communication device only has a function of making calls. The current mobile communication device has become a mini computer with functions of messages, games, notebooks, camera, and the Internet surfing. People more and more rely on mobile communication device with various functions.

People tend to make their own mobile communication device has special style different from other's. The special style may be embodied by replacing a certain setting of the mobile communication device, such as background icon, user interface, display font, ring, button icon, and etc. Because detailed items needed to be set are complicated and display design should match with the appearance of the mobile communication device, users have to undergo complicated settings to achieve the purposes

SUMMARY

On one aspect, a mobile communication device with replaceable back cover is disclosed. The mobile communication device comprises a back cover and a body. The back cover has an integrated circuit (IC) element and a first connection interface. The IC element has identification information and transmits the identification information by the first connection interface. The body has a processing unit, a storage unit, and a second connection interface. The processing unit is electrically connected to the storage unit and the second connection interface. The storage unit stores at least an application and a mapping table. The mapping table is configured to record different identification information and corresponding applications. When the back cover is assembled to the body, the first connection interface is connected to the second connection interface. The processing unit receives the identification information and looks up the mapping table according to the identification information, and the processing unit enables the corresponding application according to the mapping table.

In another aspect, a mobile communication is disclosed. The mobile communication device is configured to perform an application corresponding to a back cover. The mobile communication device comprises a connection interface for transmitting identification information of the back cover, a storage unit for storing the application and a mapping table, and a processing unit electrically connected to the connection interface and the storage unit. The mapping table records different identification information and corresponding application. When the back cover is assembled to the body, the processing unit receives the identification information by the connection interface. The processing unit looks up the mapping table according to the identification information, and the processing unit enables the application according to the mapping table.

In another aspect, a communication method is disclosed. The communication method is used for a mobile communication device with replaceable cover. The communication method comprises: selecting a back cover having an integrated circuit (IC) element and a first connection interface, the IC element having identification information; assembling the back cover to the a body, the body having a processing unit, a storage unit, and a second connection interface, the processing unit being electrically connected to the storage unit and the second connection interface, the storage unit storing at least an application and a mapping table, the mapping table being configured to record different identification information and corresponding applications; transmitting the identification information between the first connection interface and the second connection interface connected to the first connection interface; receiving the identification information by the processing unit; looking up the mapping table according to the identification information using the processing unit, for obtaining the application according to the back cover; and performing the obtained application by the processing unit.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

Figure 1A:
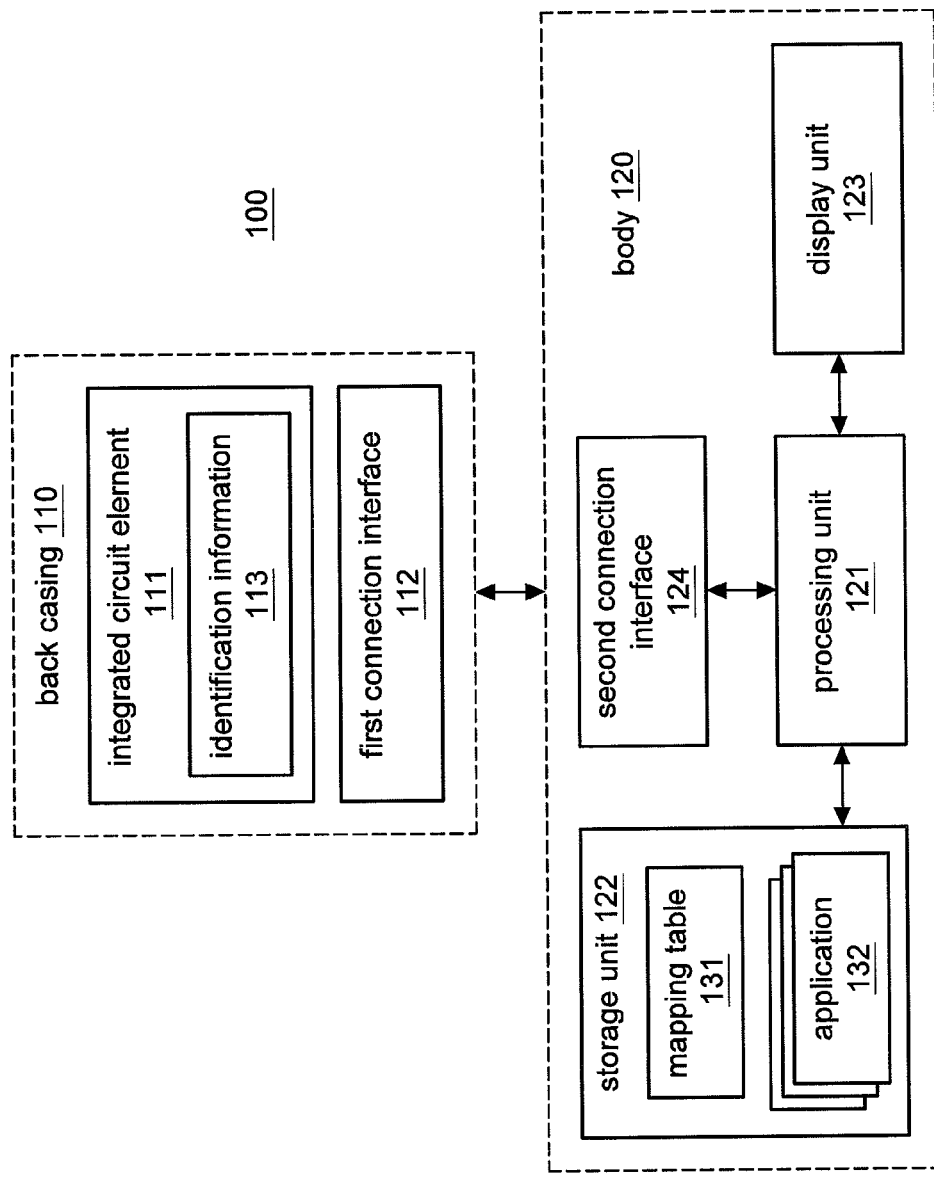
FIG. 1A is an architecture illustration of an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The detailed characteristics and advantages of the disclosure are described in the following embodiments in details, the techniques of the disclosure can be easily understood and embodied by a person of average skill in the art, and the related objects and advantages of the disclosure can be easily understood by a person of average skill in the art by referring to the contents, the claims and the accompanying drawings disclosed in the specifications.

The present disclosure is applicable in a mobile phone, a tablet personal computer (PC), a notebook, a media player, a personal digital assistant (PDA), or the combination thereof. The above mentioned device is referred to as electronic device in the following descriptions. FIG. 1A is an architecture illustration of an embodiment of the disclosure. The mobile communication device 100 in this embodiment comprises the back cover 110 and the body 120.

Figure 1B:
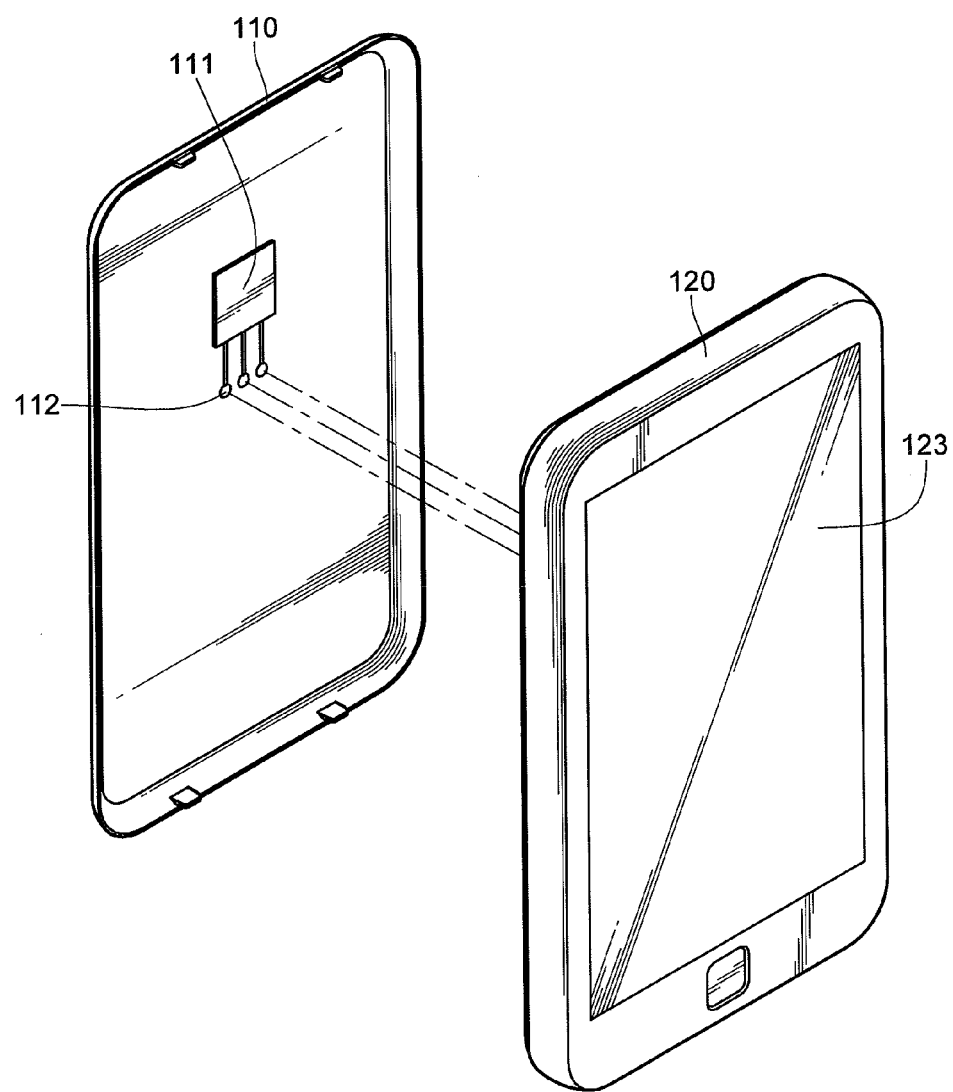
FIG. 1B shows a body and a back cover according to an embodiment of the disclosure.

The back cover 110 can be assembled to a part of the body 120 to cover certain circuit boards in the body 120. Generally, battery of the mobile communication device is replaceable and thus a detachable casing is designed to cover the battery of the mobile communication device. Here the casing may be regarded as the back cover 110 of the disclosure. Also, other detachable part of the casing can be defined as the back cover 110 of the disclosure. Furthermore, the back cover 110 can be assembled to the body 120 by way of fastening, jointing, and or locking With reference to FIG. 1B, the back cover 110 comprises the integrated circuit (IC) element 111 and the first connection interface 112.

The IC element 111 can record identification information 113 and have other functions. The transmission byte length of the identification information 113 can be set according to the hardware format which the identification information 113 uses. Other functions mentioned above may refer to wireless communication and solar charging.

Figure 1C:
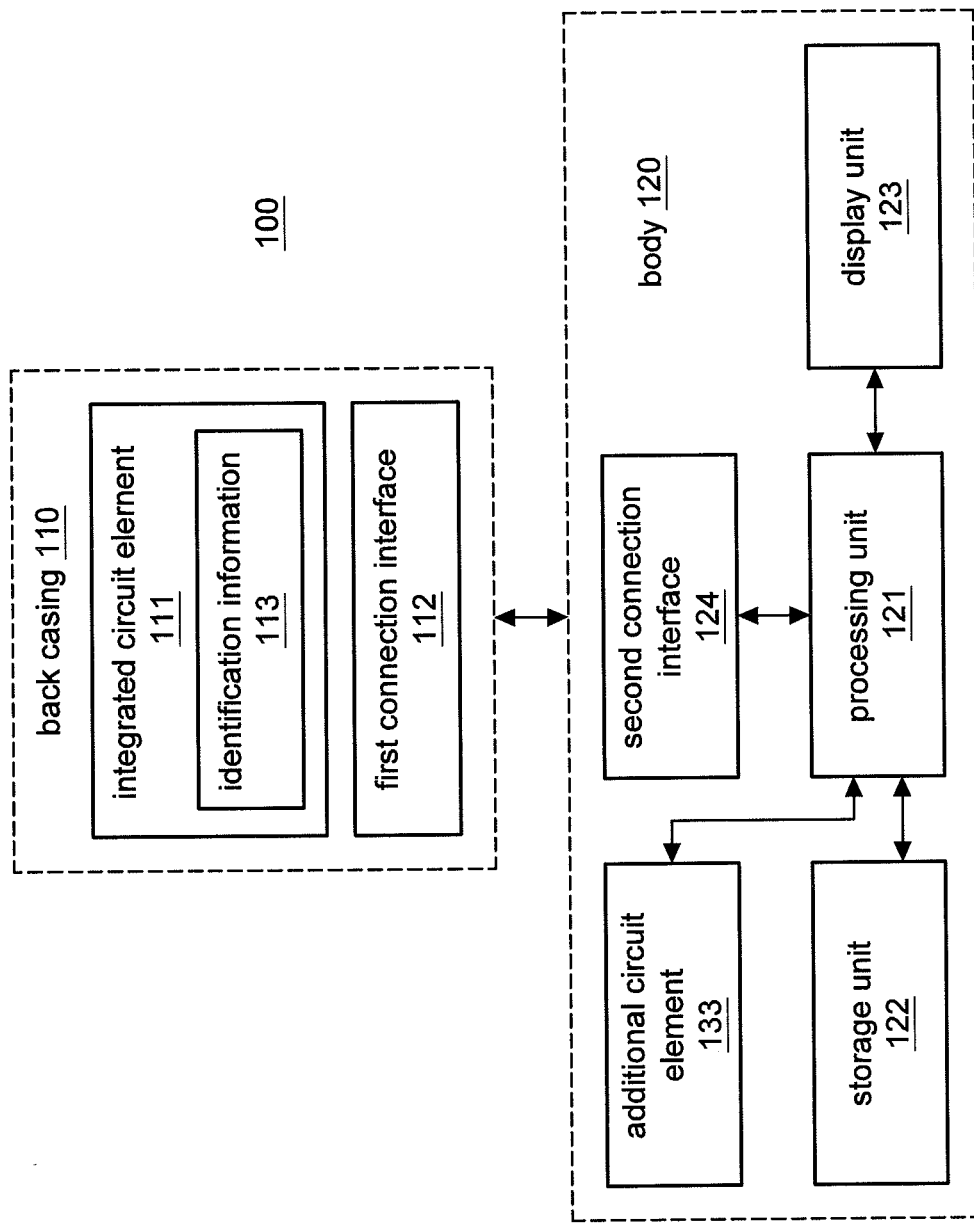
FIG. 1C is an architecture illustration of another embodiment of the disclosure.

In order to realize the functions of the IC element 111, the IC element 111 may be system on chip (SOC), single-chip microprocessor of 8051 series, Advanced RISC Machine (ARM), microprocessor, flash memory, Worldwide Interoperability for microwave access (WiMAX), solar charger, remote controller, coreless charger, or Near Field Communication (NFC). In addition, with reference to FIG. 1C, an additional circuit element 133 may be set independent from the IC element 111. The function such as solar charging, coreless charger, or WiMAX may be performed by the additional circuit element 133. In this case, the processing unit 121 may drive the additional circuit element 133 to perform corresponding programs. In other words, various functions can be set not only in the back cover 110 but also in the body 120. When different back cover is assembled to the body 120, the mobile communication device may enable the corresponding function.

The identification information 113 recorded by the IC element 111 can be transmitted to the body 120 by the first connection interface 112. The type of the first connection interface 112 may be determined according to the type of the mobile communication device 100. For example, the first connection interface 112 may have three connection pins, but the number of the pins is not limited this way. Alternatively, the identification information 113 may be transmitted by the transmission protocols such as General Purpose I/O (GPIO), Universal Asynchronous Receiver/Transmitter (UART), Secure Digital Input/output (SDIO), or Universal Serial Bus (USB).

The body 120 at least comprises the processing unit 121, the storage unit 122, the display unit 123, and the second connection interface 124. The processing unit 121 is electrically connected to the storage unit 122, the display unit 123, and the second connection interface 124. The storage unit 122 may be a flash memory, a Read Only Memory (ROM), a Random Access Memory (RAM), a hard disk, or the combination thereof.

The storage unit 122 stores not only the mapping table 131 and identification programs, but also the operation system and the application 132 for the operation of the body 120. The application 132 may be one of theme, program icon, Graphical User Interface (GUI), and ring. Also, the application 132 may be media player, browser, address book, or notebook.

The processing unit 121 calls and performs the related programs in the storage unit 122 by the operation system. Furthermore, the application may be the related program for the additional function as mentioned above (detailed description will be disclosed below).

The display unit 123 may play the operation status of the mobile communication device 100 or the computing result of programs. Additionally, the display unit 123 may display messages for operation. For example, when the processing unit 121 performs the media player program, the display unit 123 may draw the corresponding and show the play schedule of the media file in real time. When the mobile communication device 100 is performing a calling program, the display unit 123 may draw several functional buttons for the calling. Furthermore, the display unit 123 may be realized by Liquid Crystal Display (LCD), Laser Phosphor Display (LPD), or other display methods. In addition, the display unit 123 may have function of inputting commands by combining various touch control techniques, such as capacitive sensing, resistive sensing, infrared ray sensing, optical sensing, or ultrasonic wave sensing.

Figure 1D:
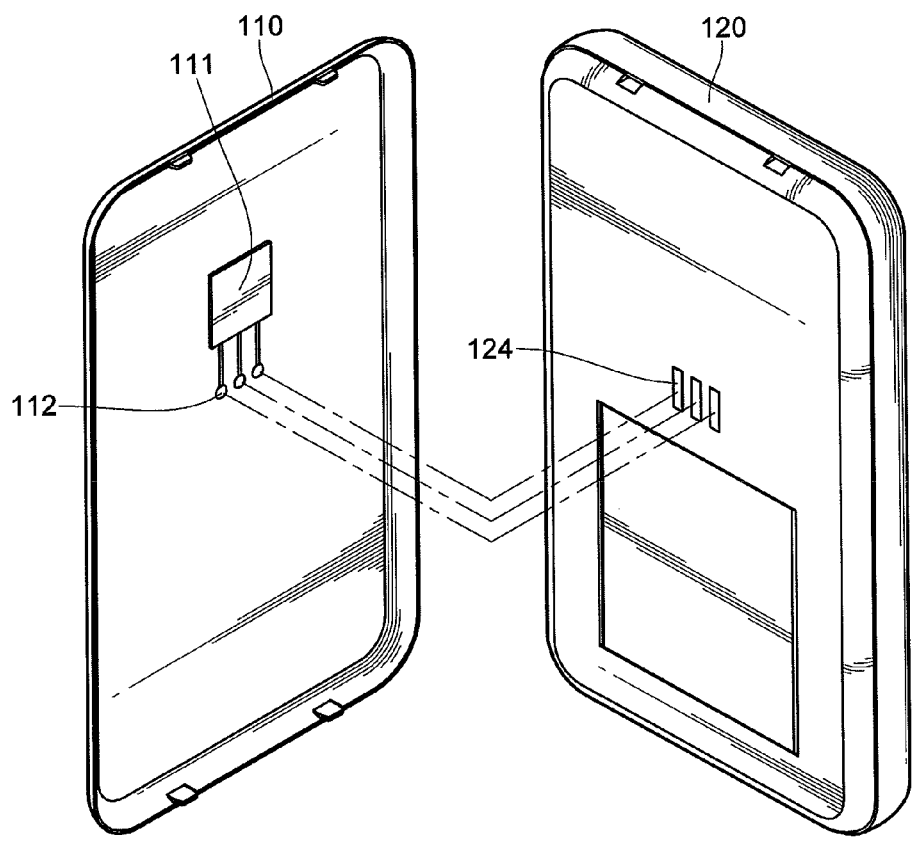
FIG. 1D shows the positions of a first connection interface and a second connection interface according to an embodiment of the disclosure.

The position of the second connection interface 124 is set corresponding to the position of the first connection interface 112. When the back cover 110 is assembled to the body 120, the first connection interface 112 can contact with the second connection interface 124. The type of the second connection interface is the same as that of the first connection interface. For example, if the first connection interface 112 is GIPO, the second connection interface 124 is also GIPO. With reference to FIG. 1D, the processing unit 121 can obtain the identification information 113 from the IC element by the first connection interface 112 and the second connection interface 124.

Figure 2:
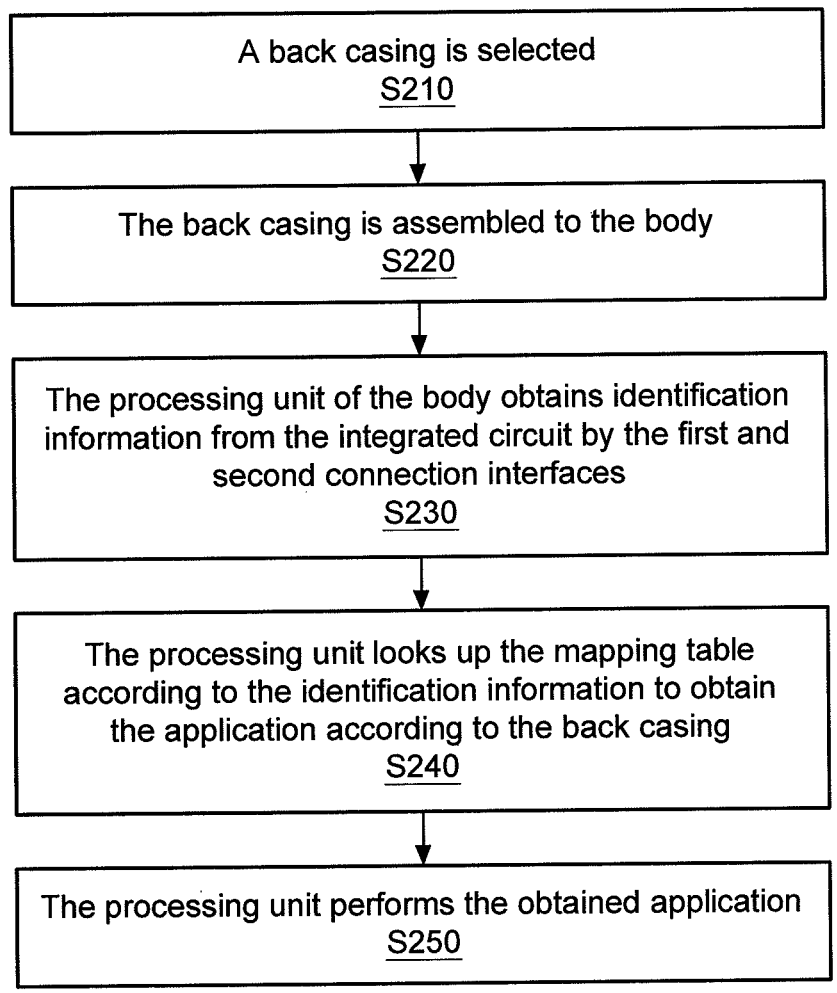
FIG. 2 shows operation flow according to an embodiment of the disclosure.

FIG. 2 shows the operation flow of an embodiment the present disclosure. The operation flow includes the following steps.

Step S210: a back cover is selected;

Step S220: the back cover is assembled to a body;

Step S230: a processing unit of the body obtains identification information from the IC element by a first connection interface and a second connection interface;

Step S240: the processing unit looks up a mapping table according to the identification information so as to obtain a corresponding application of the back cover; and Step S250: the processing unit performs the obtained corresponding application.

In particular, a user firstly selects the back cover 110 according to the function to be performed. Then, the back cover 110 is assembled to the corresponding part of the body 120 so that the first connection interface 112 is contacted with the second connection interface 124. The processing unit 121 obtains the identification information 113 from the IC element by the first connection interface 112. Different identification information 113 corresponds to different functions. When a user assembles the back cover 110 to the body 120, the processing unit 121 performs the corresponding application 132 according to the type of the back cover 110.

In other words, different types of back cover 110 correspond to different additional functions. Additional functions can be performed by the IC element 111 or by the application 132 in the body 120 performed by the identification information 113. That is, the application 132 can be stored in the body 120 or in the IC element 111.

After obtaining the identification information 113 of the back cover 110, the processing unit 121 looks up the mapping table 131 according to the identification information 113. The mapping table records the identification information 113 and the performed application 132 for different types of back cover 110. After finding the application 132 to be performed, the processing unit may obtain the application 132 from the body 120 or the IC element 111.

If a user detaches the back cover 110 from the body 120, the application 132 is closed. If the body 120 has the preset application 132 (or preset status), the body 120 will perform the preset application 132 (or be in preset status) after the back cover 110 is detached from the body 120. In other words, when a user detaches the back cover 110 from the body 120, the body 120 will disable the application 132. Disabling the application 132 includes closing or freezing the application 132 so that the application won't take up operation resources of the processing unit 121.

Figure 3:
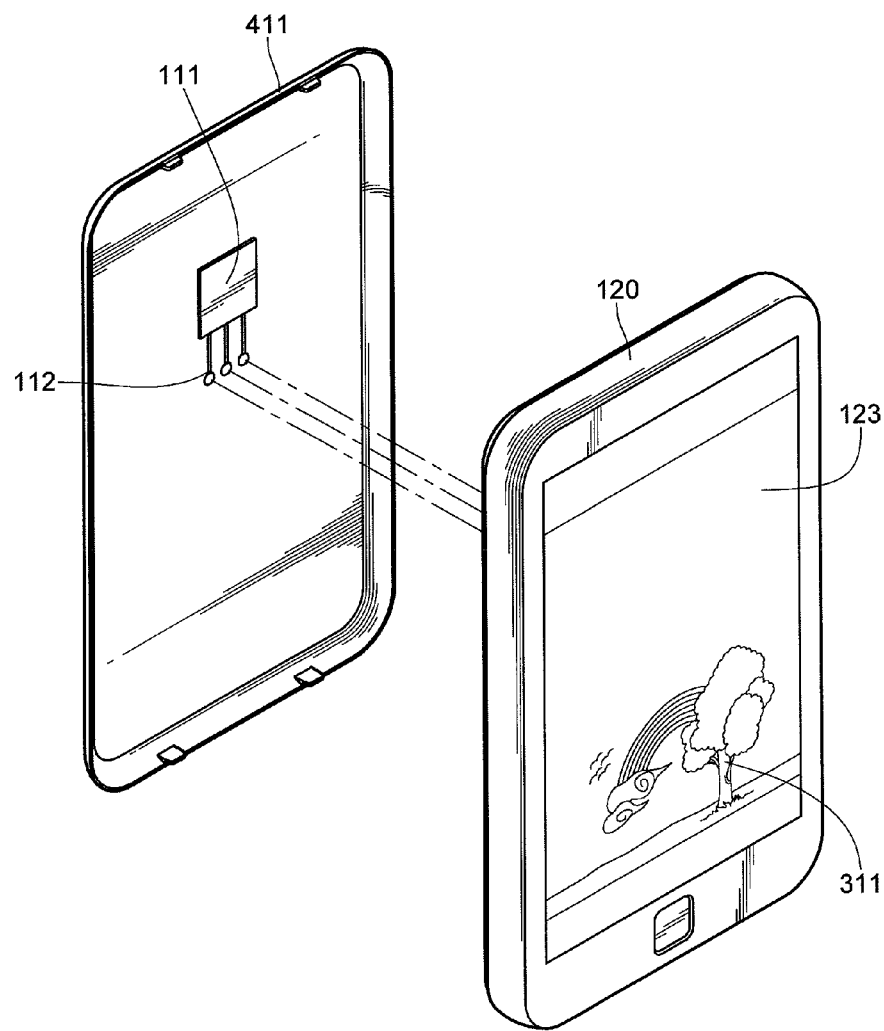
FIG. 3 shows the body on which a preset theme is displayed when a back cover is not assembled to the body.
Figure 4:
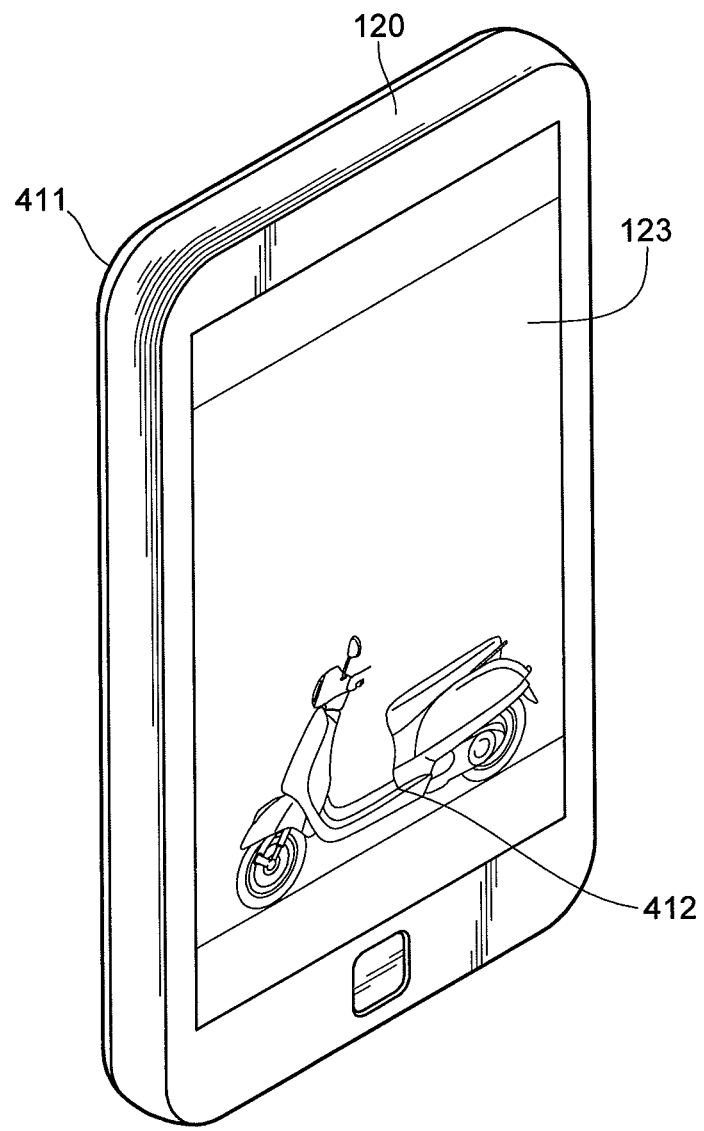
FIG. 4 shows the body on which a first theme is displayed when a first back cover is assembled to the body.
Figure 5:
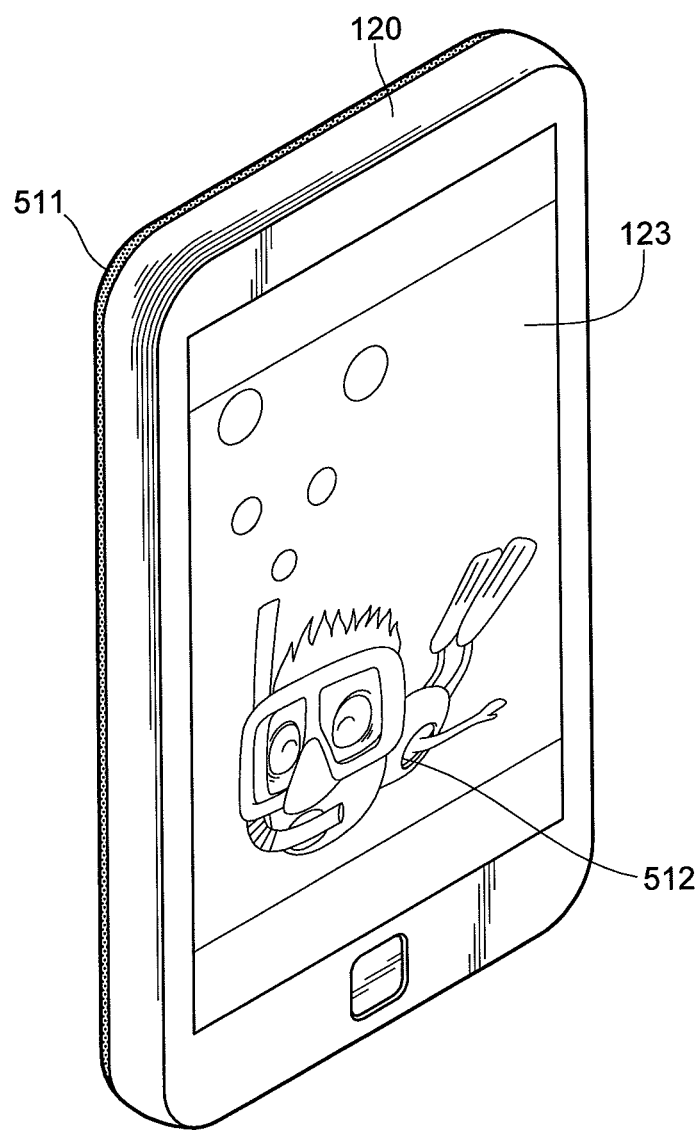
FIG. 5 shows the body on which a second theme is displayed when a second back cover is assembled to the body.

With reference to FIGS. 3-5, the process of performing the application 132 when replacing the back cover 110 will be described. Suppose that a user has a first back cover 411 and a second back cover 511. The first back cover 411 has first identification information and the second back cover 511 has second identification information. Either the first identification information or the second identification has the transmission format of eight-byte length, but the byte length is not limited this way. The following table 1 shows definition of each byte.

TABLE 1 transmission format of this embodiment

| Byte 1 | Byte 2 | Byte 3 | Byte 4 | Byte 5 | Byte 6 | Byte 7 | Byte 8 |
|---|---|---|---|---|---|---|---|
| Type of the application | | | | Type of the display color | | | reserved |

As shown in table 1, byte 1 to byte 4 represent the type of the application 132 to be performed. Byte 5 to byte 7 represent the type of display color of the application 132. In this embodiment, byte 8 is used for reserved byte. In other embodiments, byte 8 may be used to represent the version number. Accordingly, developers can set corresponding color applications for different back covers. For example, developers may provide 16 types of applications, each having 8 types of display color.

In order to distinguish clearly the first back cover 411 and the second back cover 511, the second back cover is colored by grays. The application 132 corresponding to the first identification information is a first theme 412 and the application 132 corresponding to the second identification information is a second theme 512. Here the theme refers to the font, display color, background icon, and button icon of the mobile communication device 100.

The storage unit 122 of the mobile communication device 100 has a set of preset themes 311. When a user assembles the first back cover 411 to the body 120, the processing unit 121 switches the preset theme 311 to be the first theme 412. In this switching process, the processing unit 121 may perform the read program (i.e., the application 132) to load the theme. The read program may obtain the first theme 412 by the access path defined previously. The first theme 412 may be stored previously in the storage unit 122 or in the IC element 111 of the first back cover 411. When the processing unit 121 detects that the first back cover 411 is assembled to the body 120, the processing unit 121 will load the first theme 412 to replace the preset theme 311, as shown in FIG. 4. As a result, the body 120 may enable the corresponding themes according to different type of back covers.

After a user detaches the first back cover 411, the processing unit 121 may obtain a signal denoting the first back cover 411 is detached. The processing unit 121 will remove the first theme 412 and reload the preset theme 311. At this point, the processing unit 121 will also disable the first theme 412. Next, the second back cover 511 is assembled to the body 120. After obtaining the second identification information, the processing unit 121 performs the above mentioned loading program and loads the second theme 512 to the operation system. As shown in FIG. 5, the preset theme 311 is replaced by the second theme 512.

According to the present disclosure, a corresponding theme can be automatically loaded by replacing back cover 110. Furthermore, additional functions may be performed by replacing back cover 110. Take the back cover 110 having WiMAX wireless communication function for illustration, when a user assembles the back cover 110 with such a function to the body 120, the processing unit 121 obtains the identification information 113 from the back cover 110 and finds the corresponding function from the mapping table 131. After finding the WiMAX wireless communication function of the back cover 110, the processing unit will perform the application 132 for the function. The application 132 may be stored in the storage unit 122 or in the IC element 111. That is, the processing unit 121 may obtain and perform the application 132 from the storage unit 122 or the IC element. In other words, although the body 120 without the back cover does not have the function of WiMAX wireless communication, the WiMAX wireless communication can be enabled after assembling the back cover 110 to the body 120.

What is claimed is:

1. A mobile communication device with replaceable back covers, comprising:
at least two replaceable back covers comprising a first replaceable back cover and a second replaceable back cover, the first and second replaceable back covers having different functions, each of the first and second replaceable back covers comprising a first connection interface, the first replaceable back cover comprising a first integrated circuit (IC) element having first identification information and transmitting the first identification information by the first connection interface; the second replaceable back cover comprising a second integrated circuit (IC) element having second identification information and transmitting the second identification information by the second connection interface, the first and second identification information correspond to different functions;
a body engaging with one of the first and second replaceable back covers, the body comprising a processing unit, a storage unit, and a second connection interface, the processing unit being electrically connected to the storage unit and the second connection interface, the storage unit storing at least an application and a mapping table, the mapping table being configured to record the first and second identification information and corresponding applications;
wherein when the one of the first and second back covers is assembled to the body, the first connection interface is connected to the second connection interface, the processing unit receives one of the first and second identification information and looks up the mapping table according to the one of the first and second identification information, and the processing unit enables the corresponding application according to the mapping table.

2. The mobile communication device with replaceable back covers according to claim 1, wherein the IC element is system on chip (SOC), single-chip microprocessor of 8051 series, Advanced RISC Machine (ARM), microprocessor, flash memory, Worldwide Interoperability for microwave access (WiMAX), solar charger, remote controller, coreless charger, or Near Field Communication (NFC).

3. The mobile communication device with replaceable back covers according to claim 1, wherein the application is theme, program icon, Graphical User Interface (GUI), or ring.

4. The mobile communication device with replaceable back covers according to claim 3, wherein the processing unit replaces original theme, program icon, GUI, or ring according to the application.

5. The mobile communication device with replaceable back covers according to claim 1, wherein the body further comprises an additional circuit element electrically connected to one of the first and the second IC elements, the processing unit receives the one of the first and second identification information and looks up the mapping table according to the one of the first and second identification information, and the processing unit drives the additional circuit element and corresponding application according to the mapping table.

6. The mobile communication device with replaceable back covers according to claim 1, wherein the processing unit disables the corresponding application of the one of the first and second back covers when the one of the first and second back covers is detached from the body.

7. A mobile communication device for performing different applications corresponding to different function and replaceable back covers, the mobile communication device comprises:
   a body comprising a battery and a first connection interface applied above the battery;
   one of the different function and replaceable back covers having a configuration corresponding to shape of the body to engage with the body and cover the battery of the body to avoid an exposure of the battery, the at least one replaceable back cover comprising a second connection interface corresponding to and connecting with the first connection interface and an integrated circuit (IC) element having identification information; wherein the first and second connection interfaces are configured to transmit different identification information of the different function back covers, a cavity is defined when the body and the one of the different function and replaceable back covers are engaged, the battery and the first and second connection interfaces are inside the cavity;
   a storage unit for storing the application and a mapping table, the mapping table recording the different identification information and corresponding applications; and
   a processing unit electrically connected to the first and second connection interfaces and the storage unit, when the one of the different function and replaceable back covers is assembled to the body, the processing unit receiving the identification information by the first and second connection interfaces, the processing unit looking up the mapping table according to the identification information, and the processing unit enabling the application according to the mapping table.

8. The mobile communication device according to claim 7, wherein the IC element is system on chip (SOC), single-chip microprocessor of 8051 series, Advanced RISC Machine (ARM), microprocessor, flash memory, Worldwide Interoperability for microwave access (WiMAX), solar charger, remote controller, coreless charger, or Near Field Communication (NFC).

9. The mobile communication device according to claim 7, wherein the application is theme, program icon, Graphical User Interface (GUI), or ring.

10. The mobile communication device according to claim 7, wherein the processing unit replaces original theme, program icon, GUI, or ring according to the application.

11. The mobile communication device according to claim 7, the processing unit disables the corresponding application of the one of the different function and replaceable back covers when the one of the different function and replaceable back covers is detached from the body.

12. A communication method for a mobile communication device performing different applications corresponding to different function and replaceable back covers, wherein the mobile communication device comprise a body, the different function and replaceable back covers have different integrated circuit (IC) elements having different identification information, the method comprising:
   selecting one back cover from the different function and replaceable back covers, the back cover having a first IC element and a first connection interface, the first IC element having identification information;
   assembling the back cover to the body of the communication device, the body having a processing unit, a storage unit, and a second connection interface, the processing unit being electrically connected to the storage unit and the second connection interface, the storage unit storing at least an application and a mapping table, the mapping table being configured to record different identification information and corresponding applications;
   transmitting the identification information between the first connection interface and the second connection interface connected to the first connection interface;
   receiving the identification information by the processing unit;
   looking up the mapping table according to the identification information using the processing unit, for obtaining the application according to the back cover; and
   performing the obtained application by the processing unit.

13. The communication method according to claim 12, further comprising replacing original theme, program icon, GUI, or ring according to the application by the processing unit.

14. The communication method according to claim 12, further comprising:
   electrically connecting an additional circuit element to the first IC element; and
   driving the additional circuit according the mapping table.

15. The communication method according to claim 12, further comprising disabling the corresponding application of the back cover when the back cover is detached from the body.

* * * * *